(12) United States Patent
Jadhav et al.

(10) Patent No.: US 12,126,154 B2
(45) Date of Patent: Oct. 22, 2024

(54) WIRING HARNESS PROTECTOR

(71) Applicant: Deere & Company, Moline, IL (US)

(72) Inventors: Pankaj G. Jadhav, Maharashtra (IN);
Nakib Y. Siddiqui, Maharashtra (IN);
Jorge Marquez, Waterloo, IA (US)

(73) Assignee: Deere&Company, Moline, IL (US)

( * ) Notice: Subject to any disclaimer, the term of this patent is extended or adjusted under 35 U.S.C. 154(b) by 227 days.

(21) Appl. No.: 17/216,777

(22) Filed: Mar. 30, 2021

(65) Prior Publication Data

US 2022/0320843 A1    Oct. 6, 2022

(51) Int. Cl.
*H02G 3/04*    (2006.01)
*B60R 16/02*    (2006.01)

(52) U.S. Cl.
CPC ....... *H02G 3/0481* (2013.01); *B60R 16/0215* (2013.01)

(58) Field of Classification Search
CPC .......... B60R 16/0215; H02G 3/0481
See application file for complete search history.

(56) References Cited

U.S. PATENT DOCUMENTS

| | | | | |
|---|---|---|---|---|
| 3,958,300 | A * | 5/1976 | Tanaka | F16L 5/00 439/459 |
| 7,201,592 | B2 * | 4/2007 | Hata | H02G 3/0691 439/470 |
| 10,230,194 | B2 * | 3/2019 | Akagi | H01R 13/447 |
| 10,644,440 | B2 * | 5/2020 | Sugimoto | H01R 13/5812 |
| 2008/0003698 | A1 * | 1/2008 | Park | C23C 18/1673 |
| 2014/0265308 | A1 * | 9/2014 | Reilly | H02G 3/06 285/153.1 |
| 2016/0322741 | A1 * | 11/2016 | Nagayama | H01R 13/506 |
| 2020/0389003 | A1 * | 12/2020 | Kobayashi | H02G 3/22 |
| 2020/0406838 | A1 * | 12/2020 | Menez | H02G 3/0487 |

FOREIGN PATENT DOCUMENTS

| | | | | |
|---|---|---|---|---|
| JP | 2004120948 | A * | 4/2004 | H02G 3/04 |
| KR | 20090006541 | | * 7/2009 | H01R 13/629 |

OTHER PUBLICATIONS

"Backshells for DT Series" [online]. Ionnic [Retrieved on Jul. 9, 2021]. Retrieved from the Internet: <URL:https://www.ionnic.com/electrical/wiring-accessories/connector-insulators/backshells-for-dt-series.html>.

"Clutch Lever Rubber Cover for SK 125-8" [online]. CMPO [Retrieved on Jul. 9, 2021]. Retrieved from the Internet: <URL:https://www.chinesemotorcyclepartsonline.co.uk/partno_LVRCVR008>.

"PVC Soft sleeve for the Automotive &Motorcycle wire harness secondary cell connector," [online]. Yueqing Minyang Electric Co., Ltd. [Retrieved on Jul. 9, 2021]. Retrieved from the Internet: <URL:http://www.connector-terminal.com/PVC-Soft-sleeve-for-the-Automotive-Motorcycle-secondary-cell-wire-harness-connector-terminal-pvc-cover-insulation.html>.

* cited by examiner

*Primary Examiner* — Paresh Paghadal
(74) *Attorney, Agent, or Firm* — Tucker Ellis LLP; Michael G. Craig

(57) ABSTRACT

One or more techniques and/or systems are disclosed for a wiring protection device. The wiring protection device can comprise a first shell and second shell that are operably coupled with each other in a rotational engagement. The orientation, shape and hollow body of the respective shells allow for wiring to be guided through the device to a wiring coupler disposed in the second shell. Disposing the wiring and coupler(s) inside the body of the device can provide protection from contaminants during use and assembly, such as dirt, water, grease, and paint.

13 Claims, 13 Drawing Sheets

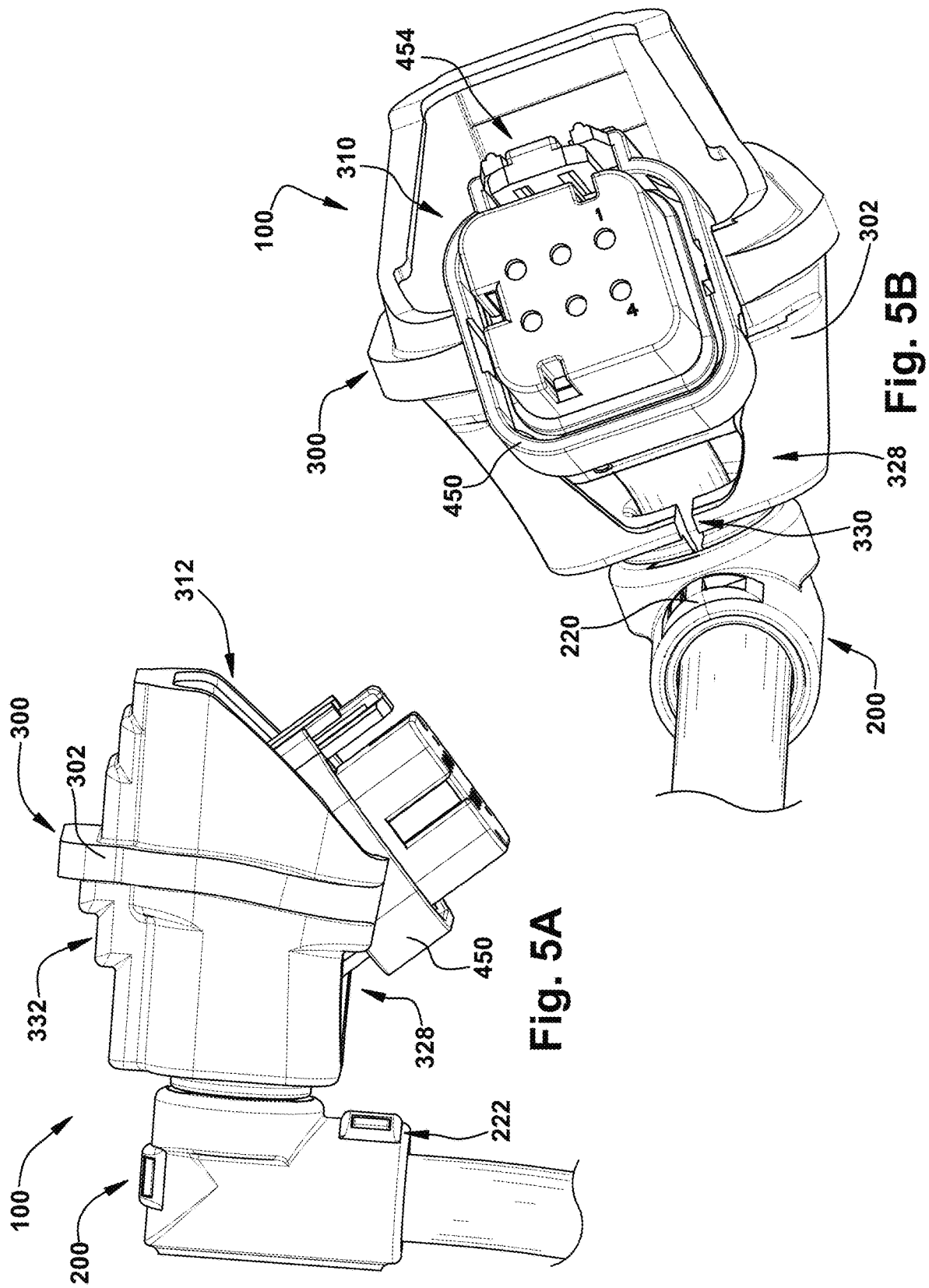

WIRING HARNESS PROTECTOR

BACKGROUND

Vehicles and other machines that comprise an engine, or other power source, utilize wiring to convey electrical and data signals, for example. Wiring is often bundled together in a wiring harness that can be conveniently routed in and around the various components of the vehicle or machine. Wiring harnesses can be made of bundled wired that are fastened together with tape, ties, or other fasteners; or they may be disposed inside a shell, tube, or other case. Typically, where one portion of a wiring harness meets another portion, or where wiring meets a component of the machine, wiring connectors or couplers are utilized to electrically couple the two sets of wires or wires to the component. Often, other types of shaped shells, clips, or other fasteners are used to route the wiring and/or couplers in s desired pattern.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. that can operably couple wit One or more techniques and systems are described herein for wiring protection device, such as a wiring back shell protector. Such a device can be used to provide protection (e.g., cover) to wiring in a vehicle wiring harness, and to wiring couplers/connectors (e.g., electrical connectors), or portions thereof, used to couple two portions of a wiring harness together, for example. The protection device can house one or more portions of the wiring harness and wiring couplers/connectors, and help guide the wires, such as around a bend, while allowing for placement in a variety of positions. In this way, the couplers and wiring can be protected from contaminants during use (e.g., dirt, water, ice, grease, chemicals, etc.), and during assembly (e.g., paint, grease, chemicals, etc.)

In one implementation of a wiring protection device, a first shell can comprise a hollow body. The hollow body can comprise a first opening at a first end having a second central axis. The hollow body can also comprise a second opening at a second end having a first central axis. In this implementation, the first central axis is disposed substantially perpendicular to the second central axis. Further, the second end can comprise an annular shaped first ridge. In this implementation, a second shell can comprise a hollow body comprising a first end and a second end. The first end can comprise a first opening with an annular shaped second ridge that is complementary to the first ridge. Here, the first end of the second shell is operably engaged with the second end of the first shell in a rotational engagement by coupling the first ridge with the second ridge. Additionally, the second shell body is shaped to fit a first wiring coupler inside the hollow body.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

FIGS. 5A and 5B are component diagrams illustrating various views of one implementation of the wiring protection device, as described herein.

DETAILED DESCRIPTION

Figure 1A:
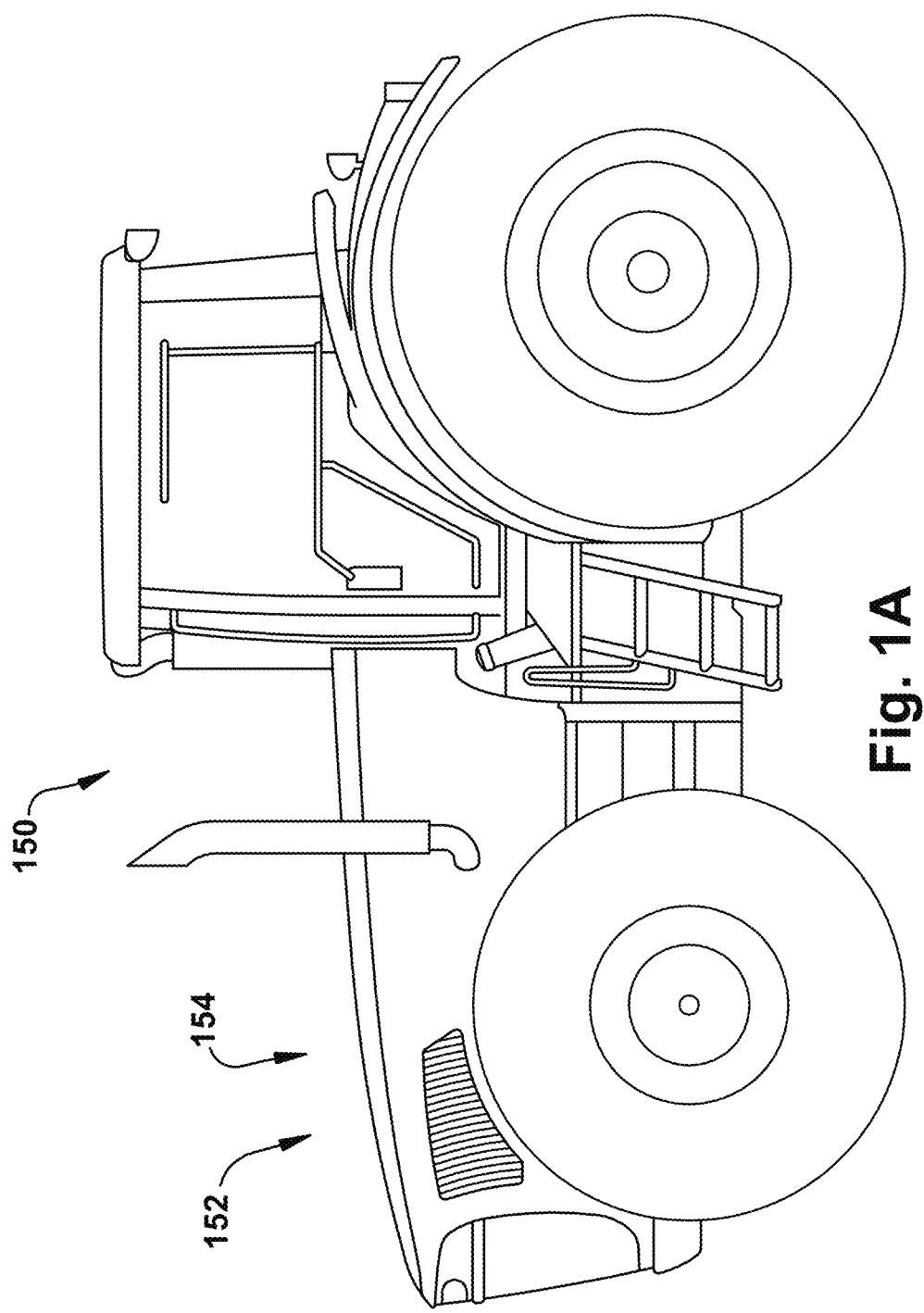
FIGS. 1A and 1B are component diagrams illustrating an example vehicle, and portions thereof, where one or more portions of one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A wiring protection device can be devised that can be operably coupled with a wiring connector used in a vehicle. For example, the wiring protection device can provide protection to wiring and wiring connector in a vehicle from paint intrusion during painting, and from contaminants and physical damage during vehicle operation. Further, the device described herein can be configured to provide for desired wiring routing to/from the wiring connector, such as by providing housing that routes wires around a bend (e.g., a substantially ninety degree elbow). Additionally, the device described herein can allow for easy configuration of the wiring bend in relation to the wiring coupler (e.g., electrical or other connector). In some implementations, the device can provide for varied coupling configurations for the wiring (e.g., comprising electrical wiring, communication wiring, or other wiring types) and wiring couplers, allowing for improved integration into a vehicle system, while providing protection from contaminants and physical damage.

Figure 1B:
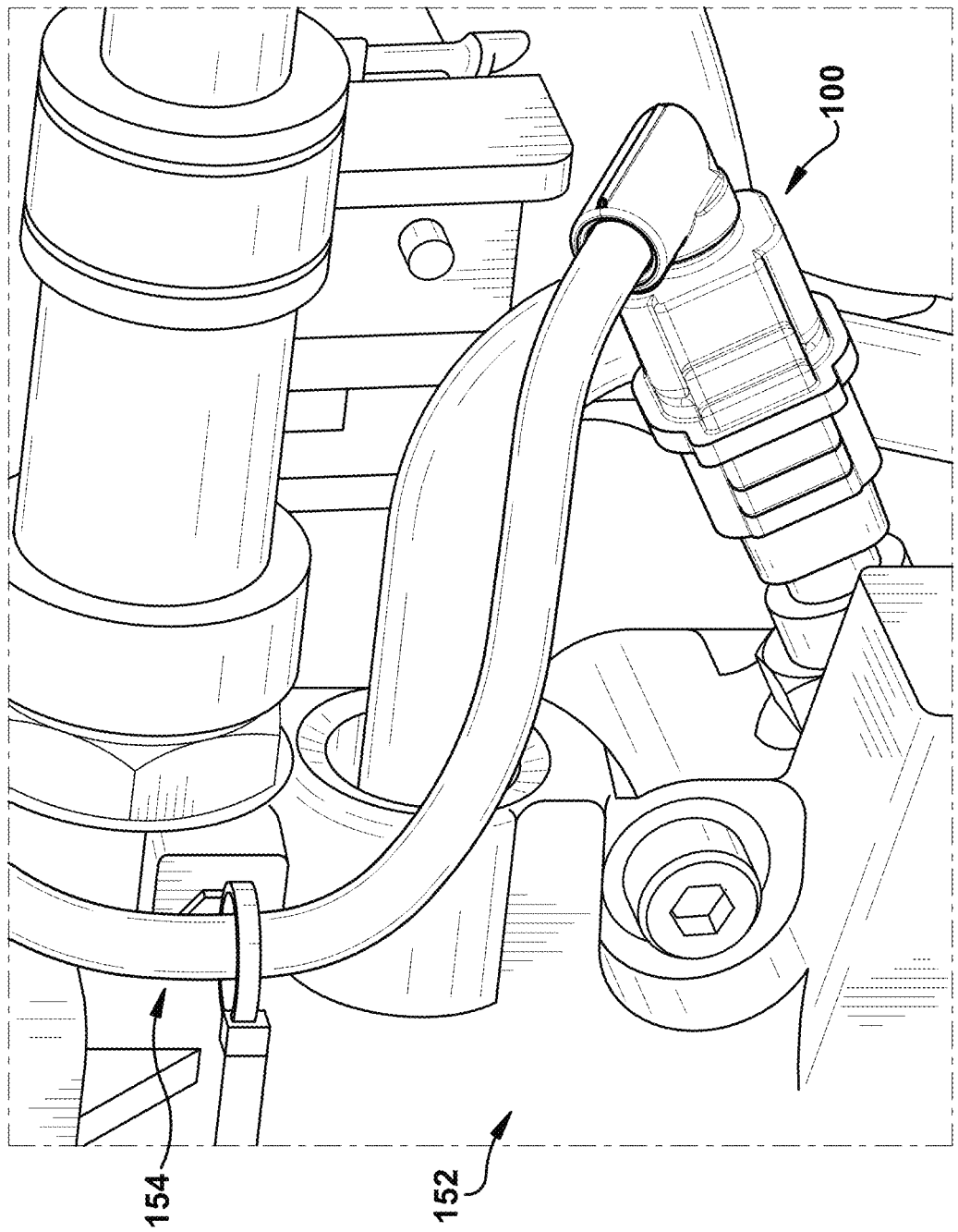

FIGS. 1A and 1B are component diagram illustrating an example implementation of an example use of the wiring protection device described herein. In this example, an agricultural or construction vehicle 150, such as a tractor, hauler, or the like, can be powered by an engine 152. In this example, the engine 152 may utilize certain wiring systems 154, wiring, wiring harnesses, wiring couplers, wiring connectors, etc., for use in electrical and communication coupling, for example. In these example, a wiring system 154 can comprise wiring couplers, which may benefit from the use of an example wiring system protection device 100. For example, the protection device may protect portions of the wiring system (e.g., couplers, wiring) during painting, and during operation or use. Further, the example device 100 can help route wiring as desired to accommodate the application with the engine 152.

Figure 2A:
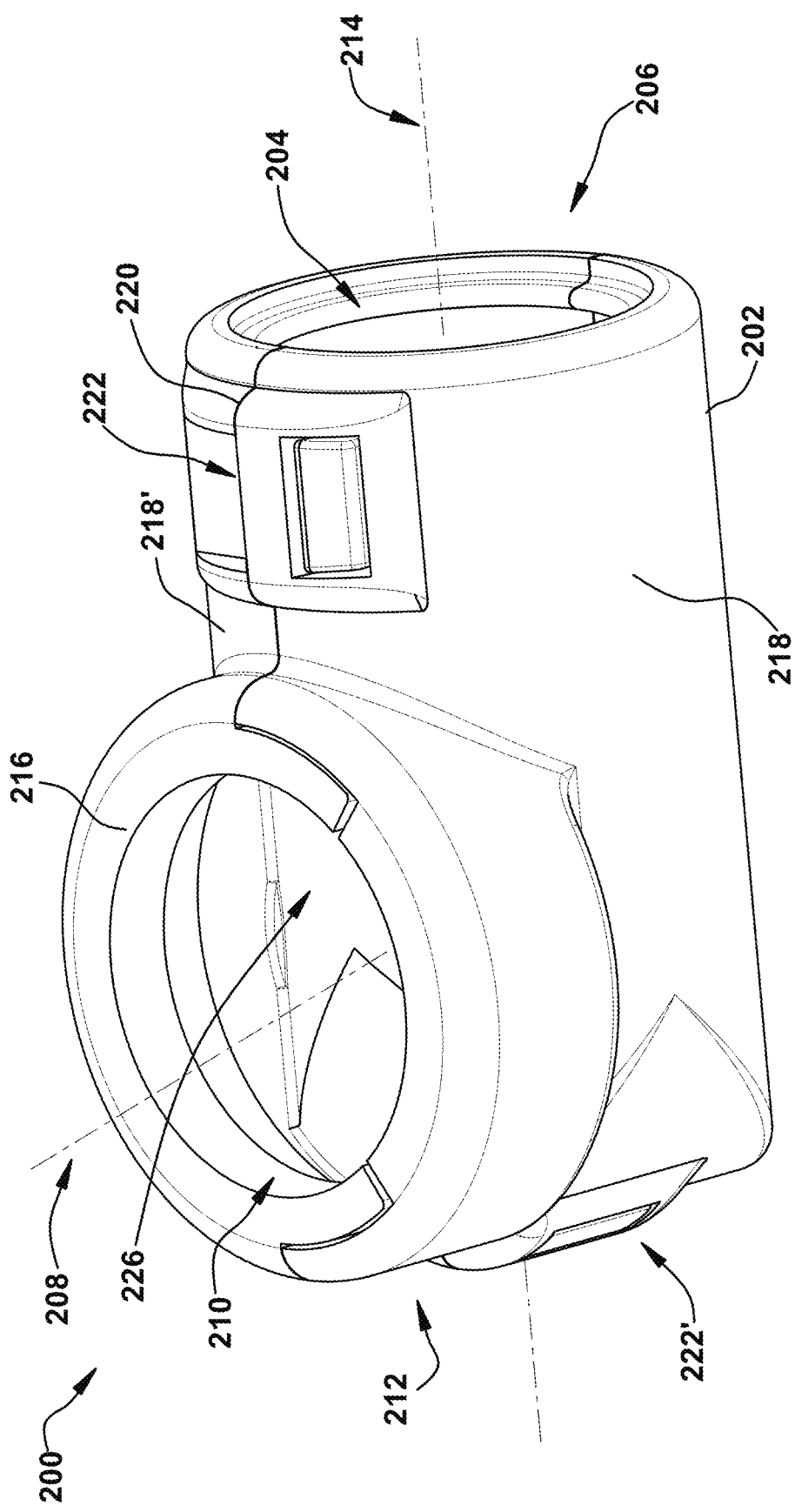
FIGS. 2A, 2B and 2C are component diagrams illustrating various views of one implementation of a portion of a wiring protection device, as described herein.
Figure 2B:
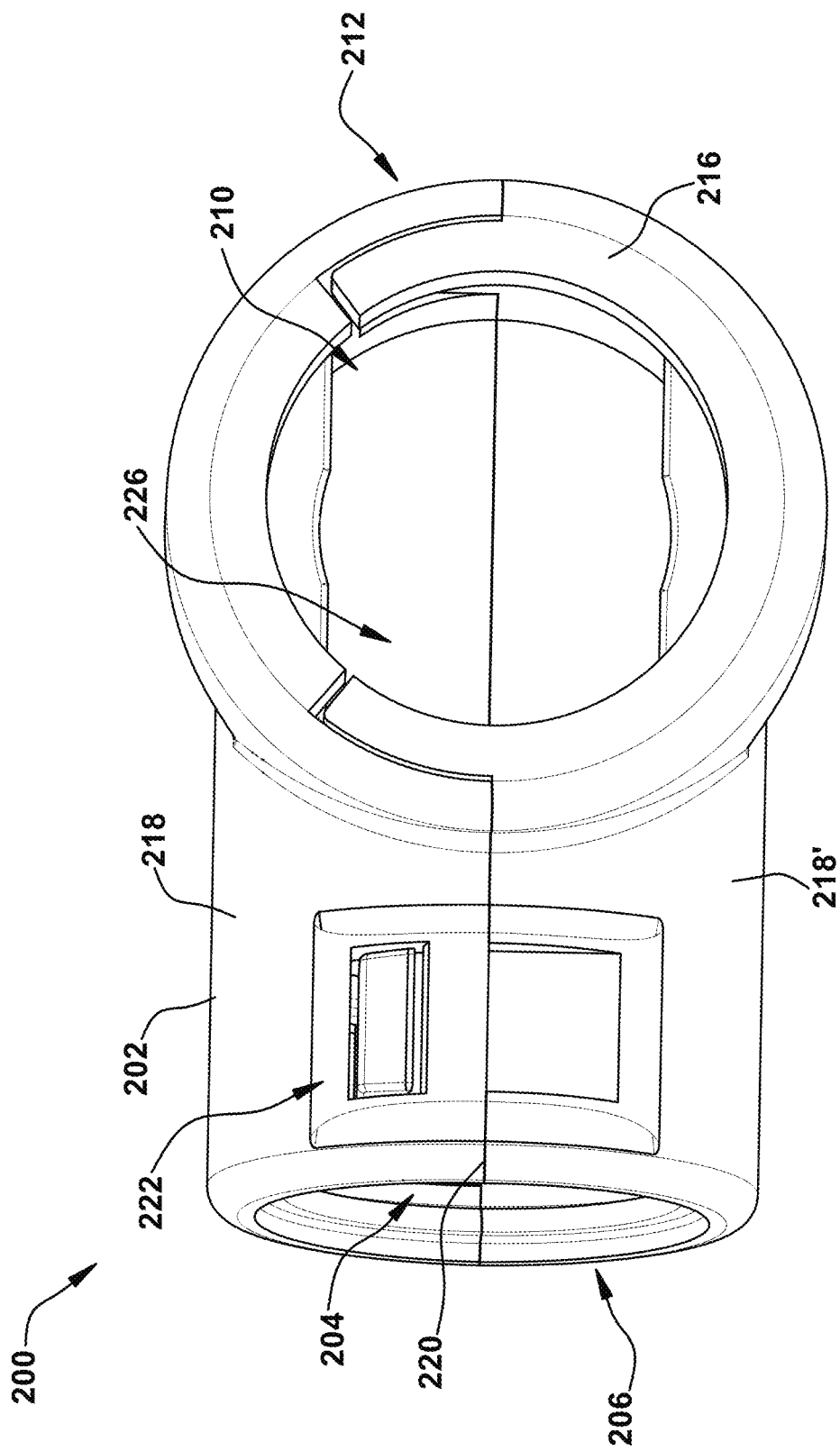
Figure 2C:
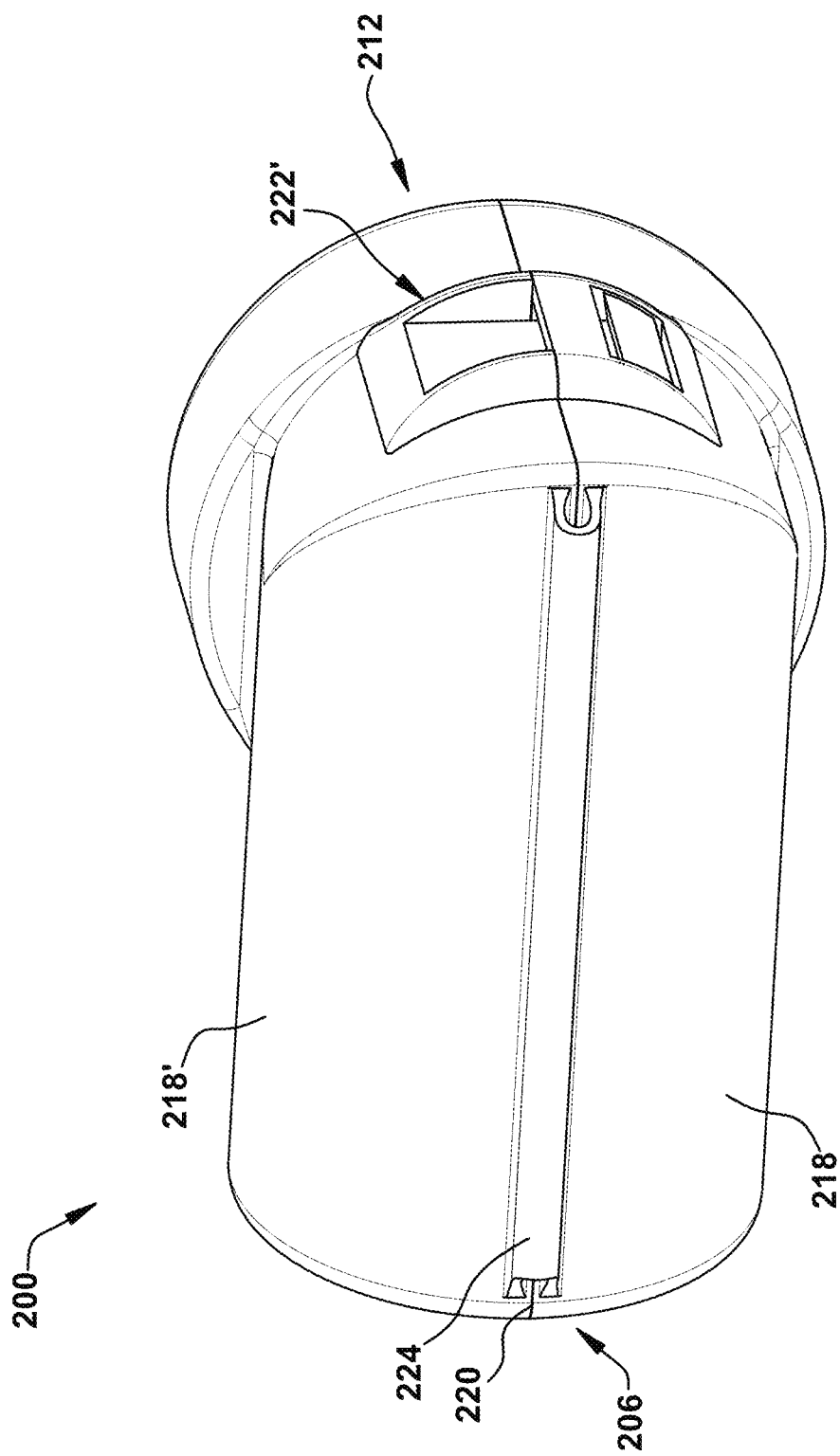

FIGS. 2A, 2B, and 2C are component diagrams illustrating one or more portions of an example wiring protection device, such as device 100 in FIG. 1B. In this example implementation, a first shell 200 of the wiring protection device can comprise a hollow body 202. Further, the first shell 200 comprises a first opening 204 disposed at a first end 206, where the first opening 204 has a second central axis 214. A second opening 210 is disposed at a second end 212, and the second opening 210 has a first central axis 208. The first central axis 208 is disposed substantially perpendicular to the second central axis 214. Additionally, the second end comprises an annular shaped first ridge or lip 216. In this example implementation, as illustrated, the first opening 204 comprises and annular shape, which may facilitate in appropriately coupling with an annular, tube-shaped wiring harness. It is anticipated that other appropriate shapes for the first opening 204 may be utilized, such as to accommodate receiving differently shaped wiring harnesses. For example, a square, rectangle, or other polygon shape may be used.

In some implementations, the first shell 200 comprising two sides 218, 218' that respectively divide the first opening 204 and the second opening 210. In this implementation, the two sides 218, 218' can be selectably detachable from each other at least along one opening edge 220 to provide access to an interior 226 of the hollow body 202. For example, the first shell 200 can be separated into two parts (e.g., substantially equal, or otherwise divided portions), such as to provide access to the respective opening, for example, in order to install the first shell around target wiring.

In some implementations, the first shell 200 can comprise a latch assembly 222, 222', portions of which are disposed on respective sides of the opening edge 220 of the sides 218, 218'. The latch assembly 222, 222' can be used to selectably fasten the two sides 218, 218' together, and to selectably detach the two side 218, 218' from each other. It should be appreciated that one or more latch assemblies may be employed at various locations around the body 202 of the first shell 200 to operably engage the two side 218, 218' together in a selectably fixed arrangement. In some implementations, the first shell 200 can comprise a hinge 224 that operably holds the two sides 218, 218' together when selectably opened and closed. For example, the latch assembly 222, 222' can be used in combination with the hinge 224 to operably hold the two sides 218, 218' together, such as when disposed around a target wiring harness, or portions thereof. It should be appreciated that the hinge 224 can be disposed at any appropriate location on the body 202 of the first shell 200 to provide a hinged arrangement, such as when opening and closing the shell 200.

Figure 3A:
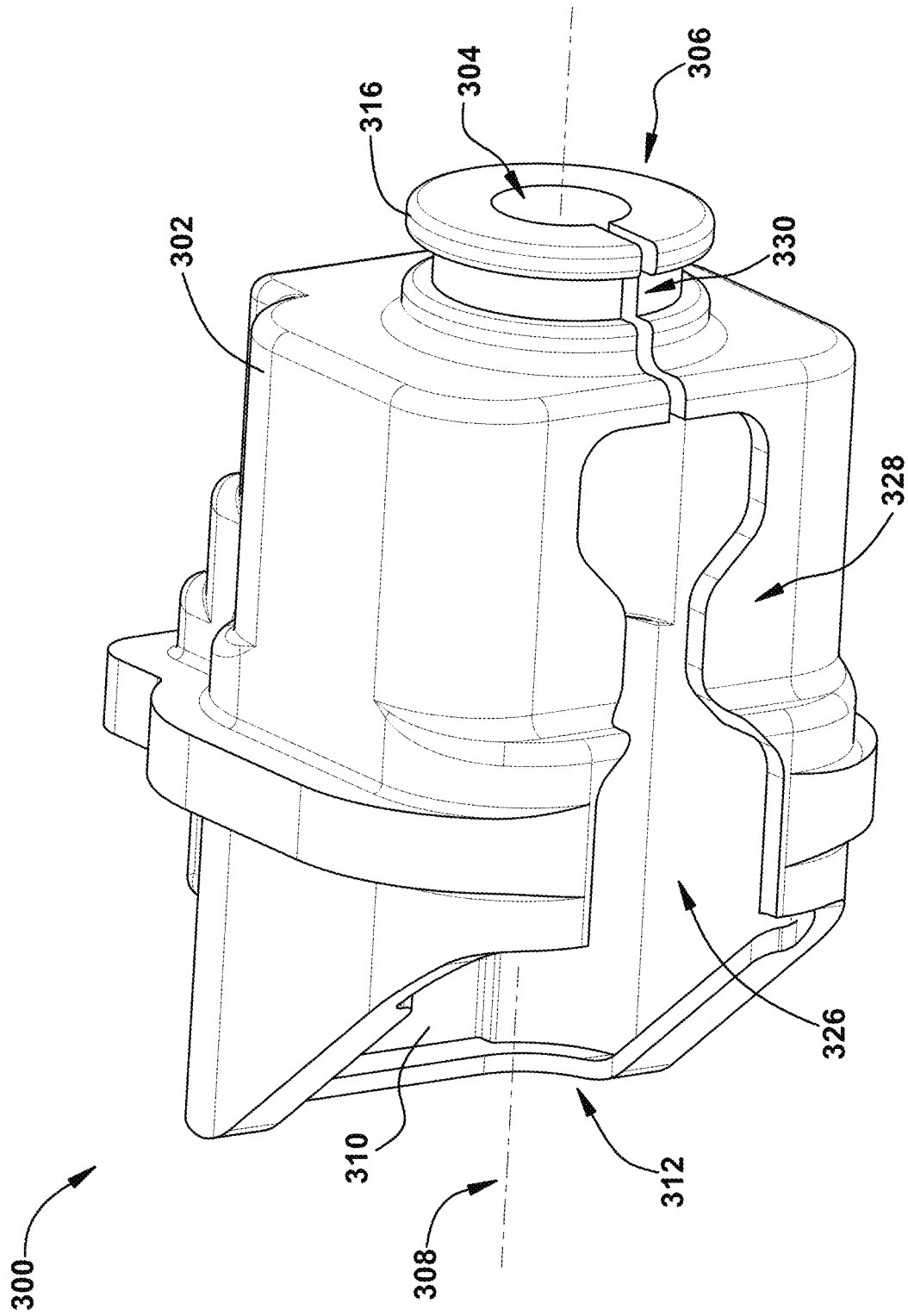
FIGS. 3A, 3B and 3C are component diagrams illustrating various views of one implementation of another portion of the wiring protection device, as described herein.
Figure 3B:
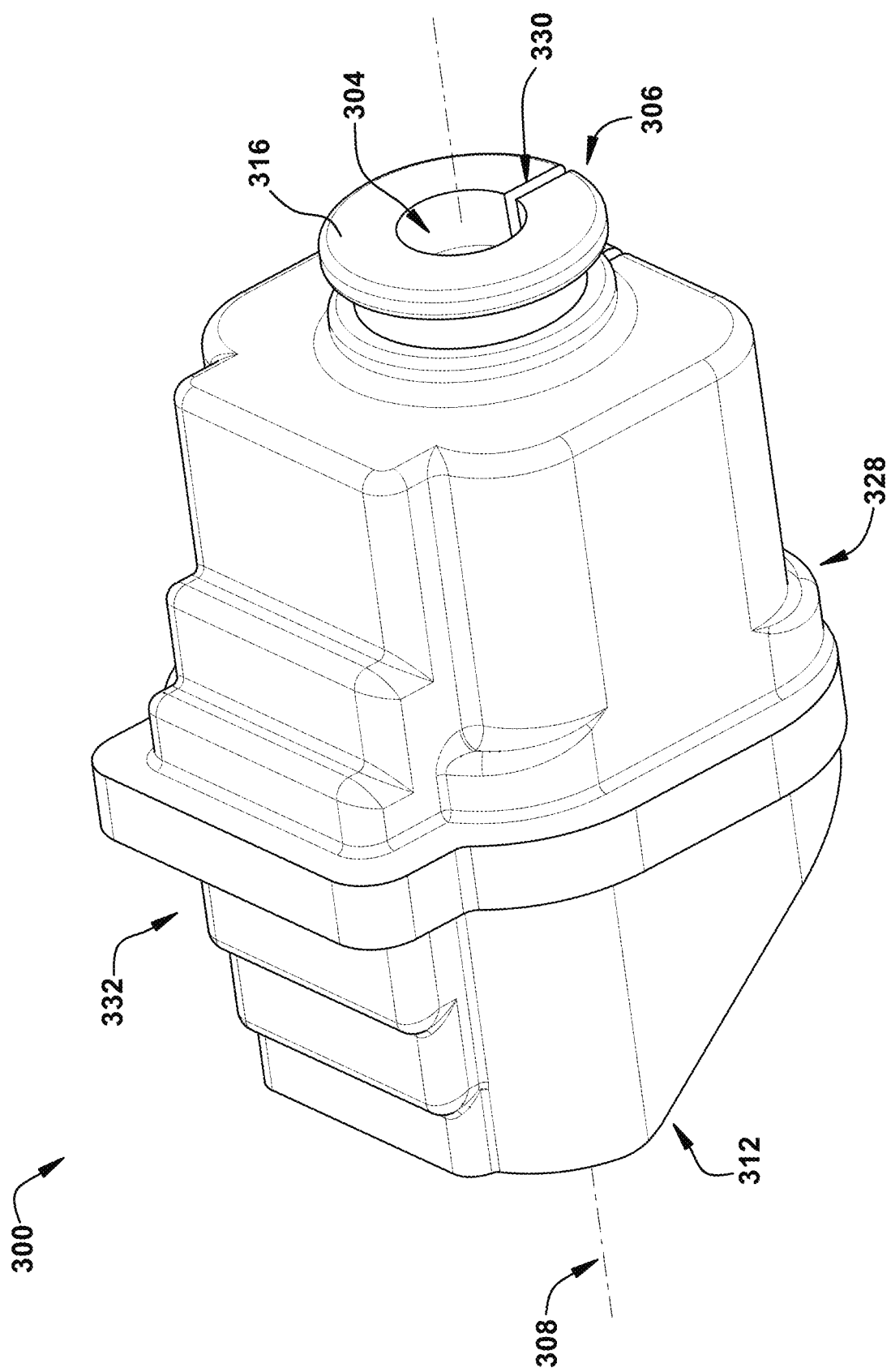
Figure 3C:
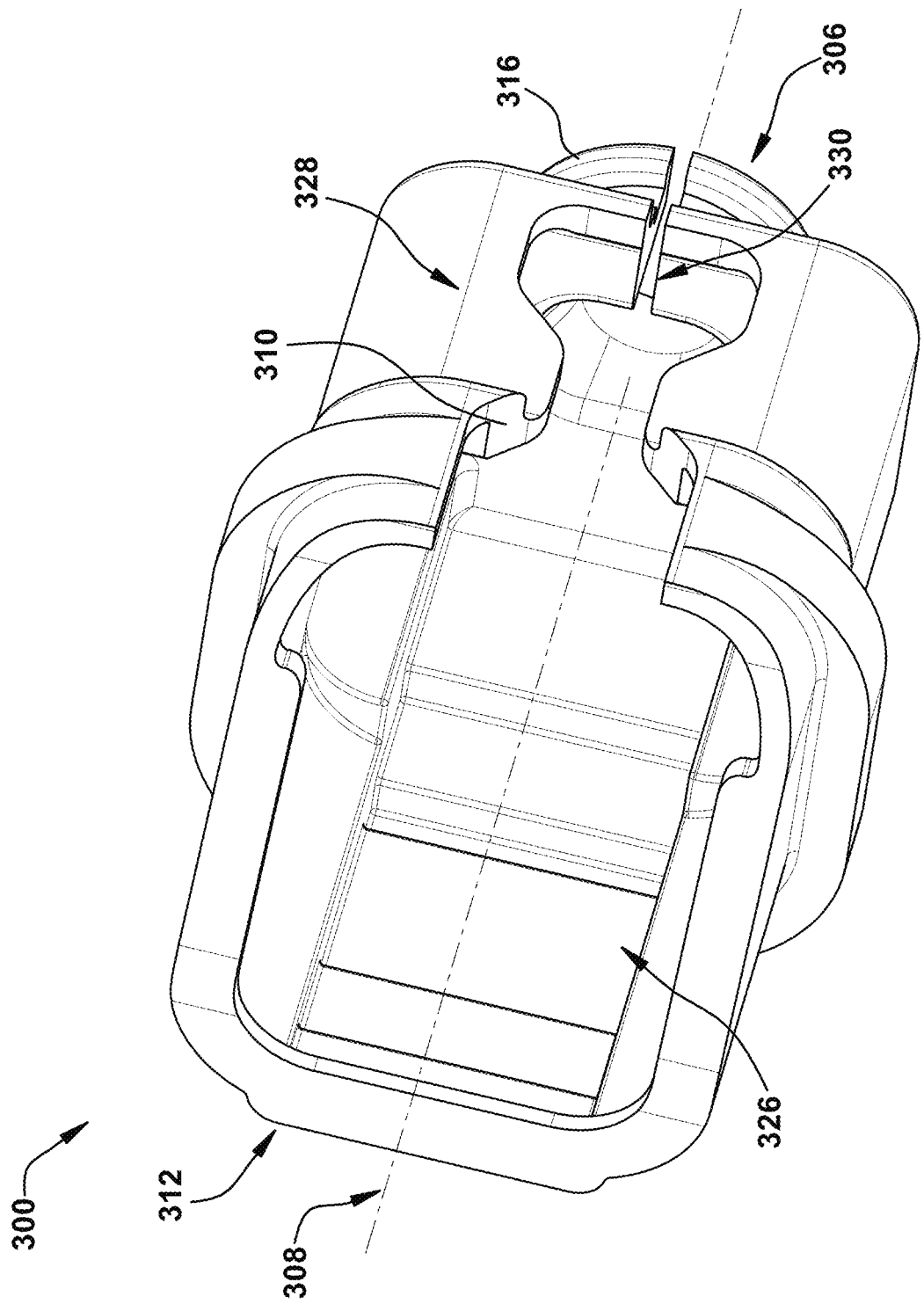

With continued reference to FIGS. 2A, 2B, and 2C, as illustrated in FIGS. 3A, 3B, and 3C, the example wiring protection device 100 can comprise a second shell 300 comprising a hollow body 302. The body 302 comprises a first end 306 and a second end 312. In this implementation, the first end 306 comprises a first opening 304 with an annular shaped second ridge 316 (e.g., lip) that is complementary to the first ridge 216. In operation, the first end 306 of the second shell 300 is engaged with the second end 212 of the first shell 200 in a rotational engagement. The rotational engagement is provided by coupling the first ridge 216 with the second ridge 316. Further, the second shell body 302 is shaped to fit a first wiring coupler inside the hollow body 302.

Figure 4A:
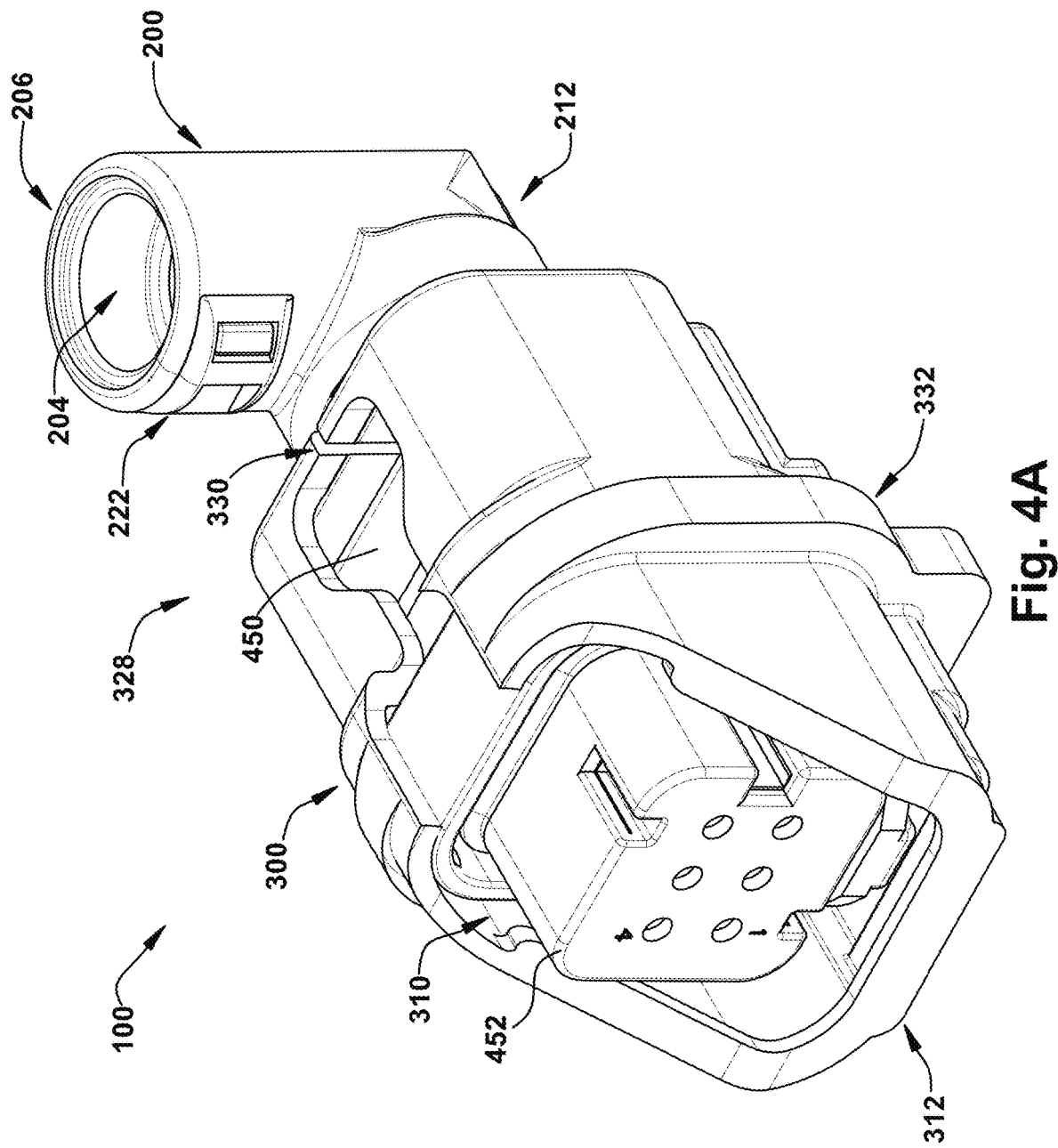
FIGS. 4A, 4B, 4C and 4D are component diagrams illustrating various views of one implementation of the wiring protection device, as described herein.
Figure 4B:
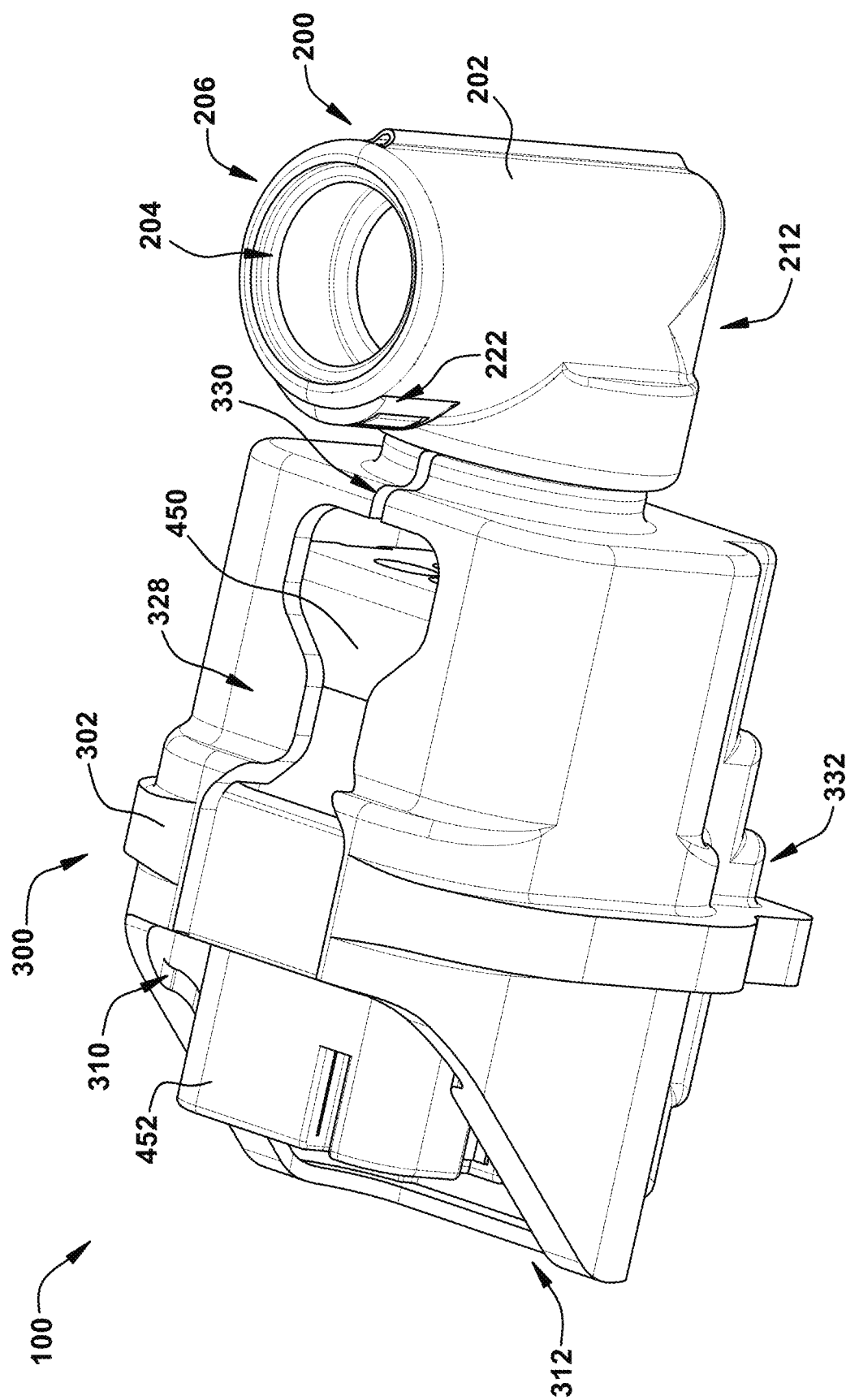
Figure 4C:
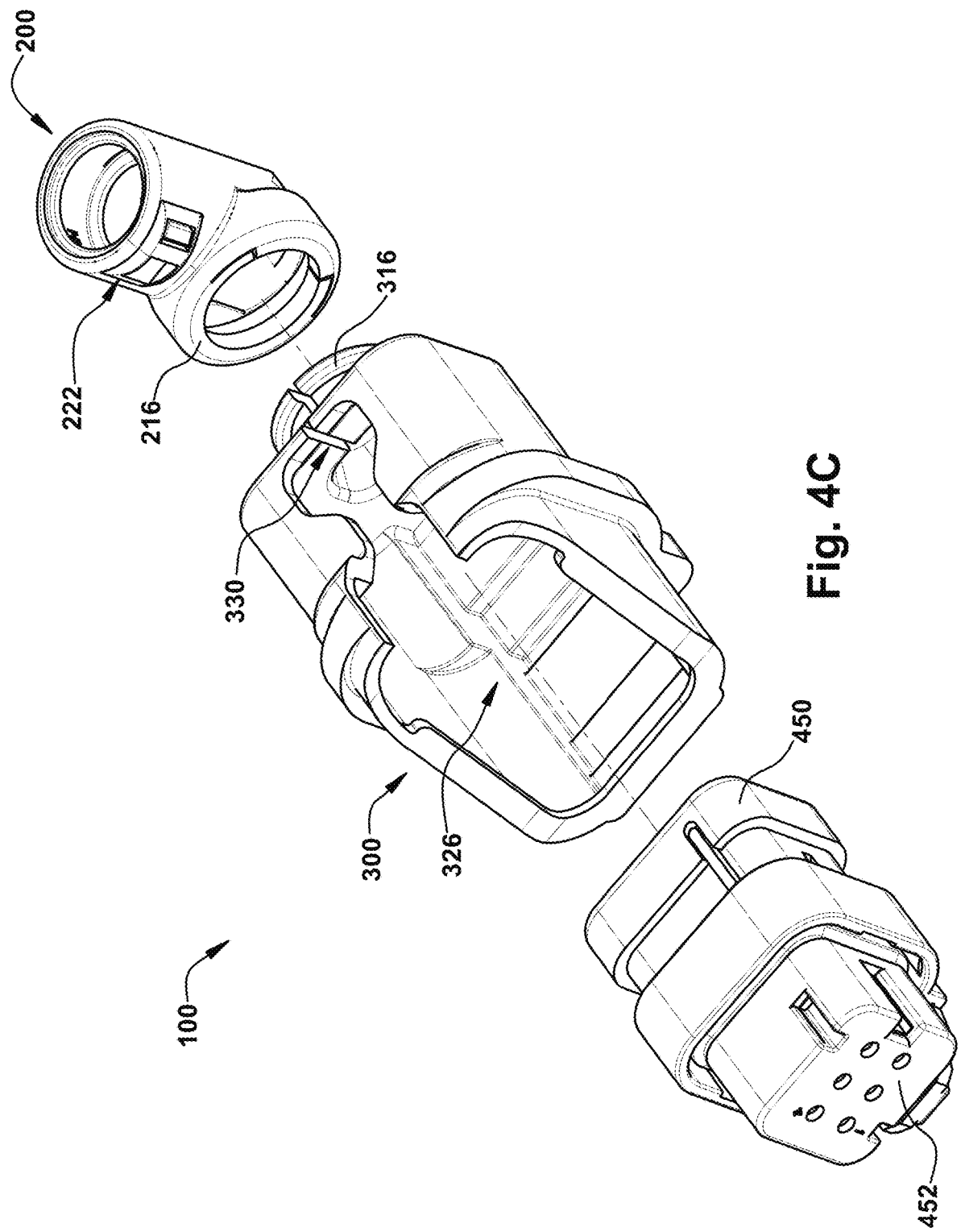

As an example, as illustrated in FIGS. 4A, 4B, and 4C, the second shell 300 can be configured, sized, and/or shaped to fit the first wiring coupler 450 (e.g., electrical connector) inside the hollow body 302. For example, a bundle of wires used in a vehicle can be comprised in a portion of a wiring harness. In this example, the bundle of wires may come together in a wiring coupler (e.g., a wiring block or connector configured to couple with a complementary block or connector to join electrical or other wires or circuits). In this implementation, the wiring coupler can operably fit inside the second shell 300, such that the second shell provides protection against contaminants during use (e.g., during painting, use in the field, maintenance, etc.). As such, in this implementation, the interior 326 of the second shell 300 can be shaped and/or sized to house a target coupler (e.g., the first wiring coupler) for which the device 100 will be used to protect, for example. In this implementation, as illustrated in FIGS. 3A-4C, the interior 326 of the second shell 300 (e.g., and consequently the outside walls) are shaped with ridges, valleys, steps, etc. that are complementary to the outside of the first wiring coupler, that results in a substantially snug fit to provide protection against contaminants, for example.

Further, in some implementations, as illustrated in FIGS. 3A, 3B, 3C, 4A, 4B, and 4C, the second shell 300 can comprise a second opening 310 that is formed at the second end 312. In this implementation, the second opening 310 can be sized (e.g., and shaped) to operably fit around the outside of a second wiring coupler 452 that is coupled with the first wiring coupler 450. The second opening 310 of the second shell 300 can continue from the second end 312 to a first side 328 of second shell 300. In this implementation, the portion of the second opening 310 at the first side can be shaped (e.g., and sized) to allow the first wiring coupler 450 to be selectably removed from the second shell body 302.

It should be noted that, while the portions of the wiring coupler, described herein, disclose a first wiring coupler 450 and a second wiring coupler 452, these wiring couplers may be comprised of more or less portions. As an example, the wiring coupler 450 may be an electrical connector main body (e.g., wiring coupler main body) that is configured to connect with another (e.g., second) wiring coupler or connector; or to a sensor other electrical component in a vehicle. Further, the second wiring coupler 452 can be comprised of one or more components. For example, a second electrical connector can be comprise of a terminal position assurance (TPA) connector 452, and a connector position assurance (CPA) connector. It should be appreciated that other configuration may be employed using sound engineering principles, and the wiring protection device described herein may be used with myriad wiring coupler configurations.

As an illustrative example, as illustrated in FIGS. 5A and 5B, at least a portion of the first wiring coupler 450 is shown disposed outside of the second opening 310, on the first side 328 of the second shell 300. In this implementation, the first shell 200 and second shell 300 are coupled together in a rotational engagement. Further, the opening 310 of the first shell 300 is sized and shaped to allow the first wiring coupler 450 to be selectably moved into and out of the body 302 of the second shell 300. For example, an operator may wish to selectably move the first wiring coupler 450 out of the second shell 300 in order to more easily access it, such as to perform maintenance, to couple with the second wiring coupler 452, or to decouple from the second wiring coupler 452. In this example, the example wiring protection device 100 can remain engaged with the wiring while access to the wiring coupler 450 is provided.

Figure 4D:
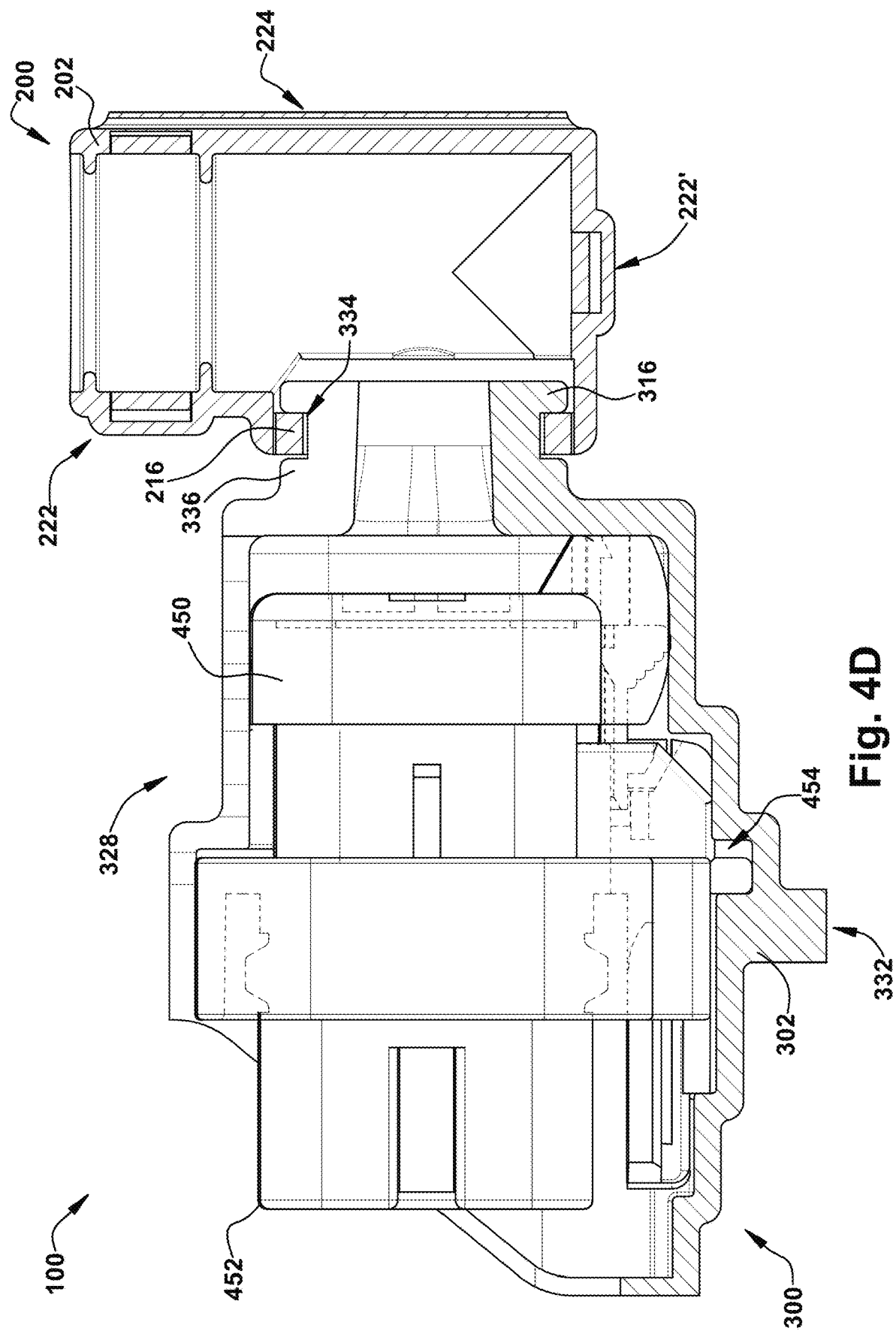

As illustrated in FIG. 4D, in some implementations, the second shell 300 can comprise a second side 332 that is shaped to operably fit over a wiring coupler latch assembly 454 that operably couples the first wiring coupler 450 and the second wiring coupler 452. That is, for example, the target first and second wiring couplers 450, 452, for which the wiring protection device is configured, can comprise a latch assembly 454, The latch assembly 454 is configured to selectably, operably hold the couplers 450, 452 together during use, and to allow for selectable decoupling for access, maintenance, replacement, etc. In this implementation, the second side 332 of the second shell 300 can be configured to appropriate cover (e.g., and protect) the latch assembly 454, and allow a user to engage with the latch assembly 454 for the purpose of decoupling. As an example, in one implementation, at least the second side 332 (e.g., or the entire body) of the second shell 300 can be comprised of a flexible material (e.g., elastomer) that allows for the operator to manipulate the latch assembly 454 from outside of the second shell 300.

As illustrated, in some implementations the second shell 300 can comprise a slit 330 in the shell body 302 through the body from the first opening 304 to the second opening 310. As an example, the slit can provide access to the first opening 304 and second shell interior 326 from the outside, such as for wiring that is engaged with a first wiring coupler 450. That is, an operator may slide wiring through the slit 330 into the first opening 304, thereby disposing the wiring in the first opening 304, and an engaged wiring coupler into the second shell interior 326. In some implementations, the body 302 of the second shell 300 can be comprised of a flexible material (e.g., elastomer), as illustrated in FIGS. 5A and 5B, which allows for the slit to be opened further to accommodate larger wiring bundles and the like.

With continued reference to FIGS. 2A-2C, and 3A-3C, FIGS. 4A-4D illustrate various views of components of the example wiring protection device 100, coupled together, in exploded view, and in section. As illustrated, the first shell 200 can be engaged with the second shell 300 at the first shell second opening 210, and the second shell first opening 304. The first shell 200 is engaged with the second shell 300 in a rotational engagement, such that the respective shells 200, 300 can rotate with respect to each other along their first central axes 208, 308. Further, as illustrated, a first ridge or lip 216 is disposed at the first shell second opening 210, and a second ridge or lip 316 is disposed at the second shell first opening 304. In this implementation, the first ridge/lip 216 and second ridge/lip 304 are complementary, such that they are configured to engage with each other to provide the rotational engagement between the shells 200, 300.

In one implementation, the first ridge 216 forms an inwardly disposed lip, and the second ridge 316 forms an outwardly disposed lip, from their respective openings 210, 304. In this implementation of operable engagement between the shells 200, 300, the second shell first end 306 is engaged with the first shell second end 212 by disposing the first ridge 216 over the second ridge 316. For example, as illustrated in FIG. 4D, the second ridge 316 is disposed inside of the first shell second opening 210, behind the first ridge 216. Further, in some implementations, the first end 306 of the second shell 300 can comprise an annular-shaped channel 334 that is formed by the second ridge 316 and a second shell stop 336, and is configured to operably receive the first ridge 216 in a rotational engagement.

In another implementation, the first ridge 216 can be formed as an outwardly disposed lip, and the second ridge 316 can be formed as an inwardly disposed lip. In this implementation, the first end 306 of the second shell 300 is engaged with the second end 212 of the first shell 200 by disposing the second ridge 316 over the first ridge 216. That is, for example, the first ridge 216 can be disposed inside of the second shell first opening 304, behind the second ridge 316. Further, in some implementations, the second end 212 of the first shell 200 can comprise another annular-shaped channel that is formed by the first ridge 216 and a first shell stop at the second end 212. In this implementation, the other annular-shaped channel can be configured to operably receive the second ridge 316 in a rotational engagement.

In some implementations, an example wiring protection device (e.g., 100), such as a back shell wiring protector, can comprise a first shell (e.g., 200) that comprises a hollow tube. In this implementation, the hollow tube of the first shell can comprise an annular first opening at a first end and an annular second opening disposed substantially orthogonal to the first opening. Further, in this implementation, the first shell can comprise two parts that are selectably detachable at least along a first side that divides the first opening and second opening. In this implementation, the example wiring protection device can comprise a second shell comprising a first end with an annular first opening that is complementary to the second opening of the first shell. In this implementation, the first opening of the second shell is operably coupled with the second opening of the first shell in a rotatable engagement. Additionally, the second shell can comprise a second opening sized to operably receive a wiring coupler block inside the second shell.

In this implementation, the first shell can comprise a hinge that couples the two parts of the first shell along a second side opposing the first side. The hinge allows for the two parts to selectably detach at the first side, and remain coupled at the second side. The first shell can comprise a latch that selectably couples the two parts together at the first side. For example the latch can be unlatched to detach the first and second sides, and relatched to couple them together. Further, in this implementation, the second shell can comprise a wall defining a hollow interior of the second shell, and the wall can comprise a slit running from the first opening to the second opening.

In this implementation, first shell comprising a first lip disposed at the second opening, and the second shell comprising a second lip disposed at the first opening. In this implementation, the first lip can be disposed over the first opening of the second shell and the second lip can be disposed inside the second opening of the first shell. Alternately, the second lip can be disposed over the second opening of the first shell and the first lip can be disposed inside the first opening of the second shell.

In another implementation, a back shell wiring protector can comprise a hollow first shell that comprises a tubular shape. The first shell can also comprise a first opening in a first plane that is disposed at a first end. The first shell can comprise a second opening disposed at a second end, where the second opening comprises an annular shape disposed in a second plane that is substantially orthogonal to the first plane. In this implementation, the first shell comprises a first lip disposed at the second opening. In this implementation, a hollow second shell can comprise an annular shaped opening at a first end. A second lip can be disposed at the opening of the first end. The second lip can be engaged with the first lip in a rotational arrangement to allow the respective first shell and second shell to operably rotate around a central axis of the second shell. Additionally, the second shell can comprise a body that is shaped to operably fit a wiring connector within the body.

In this implementation, the second shell can comprise a second opening at a second end that is sized to receive the wiring connector into the body. Here, the second opening can continue from the second end to a wall of the second shell. Further, the first shell of the back shell wiring protector can comprise two selectably separable walls and a hinge to hold to allow the walls to selectably open and close.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A wiring protection device, comprising:
   a first shell comprising a hollow body comprising a first opening at a first end having a second central axis and a second opening at a second end having a first central axis, the first central axis disposed substantially perpendicular to the second central axis, the second end comprising an annular shaped first ridge; and
   a second shell comprising a hollow body comprising a first end and a second end, the first end comprising a first opening with an annular shaped second ridge complementary to the first ridge, the first end of the second shell engaged with the second end of the first shell in a rotational engagement by coupling the first ridge with the second ridge, wherein the second shell body is shaped to fit a first wiring coupler inside the hollow body, wherein the second shell comprises a second opening at a second end sized to receive the wiring connector into the body, the second opening continuing from the second end to a wall of the second shell.

2. The device of claim 1, the first shell comprising two sides that respectively divide the first opening and the second opening, the two sides selectably detachable from each other at least along one opening edge to provide access to an interior of the hollow body.

3. The device of claim 2, the first shell comprising a latch assembly, portions of which are disposed on respective sides of the opening edge of the sides to selectably fasten the two sides together, and to selectably detach the two side from each other.

4. The device of claim 2, the first shell comprising a hinge holding the two sides together when selectably opened and closed.

5. The device of claim 1, the first ridge forming an inwardly disposed lip, and the second ridge forming an outwardly disposed lip, wherein the first end of the second shell is engaged with the second end of the first shell by disposing the first ridge over the second ridge.

6. The device of claim 1, the first ridge forming an outwardly disposed lip, and the second ridge forming an inwardly disposed lip, wherein the first end of the second shell is engaged with the second end of the first shell by disposing the second ridge over the first ridge.

7. A wiring protection device, comprising:
   a first shell comprising a hollow tube with an annular first opening at a first end and a annular second opening disposed substantially orthogonal to the first opening, the first shell comprising two parts that are selectably detachable at least along a first side that divides the first opening and second opening; and
   a second shell comprising a first end with an annular first opening that is complementary to the second opening of the first shell, the first opening of the second shell coupled with the second opening of the first shell in a rotatable engagement, the second shell comprising a second opening at a second end and sized to operably receive a wiring coupler block inside the second shell, the second opening continuing from the second end to a wall of the second shell.

8. The device of claim 7, the first shell comprising a hinge coupling the two parts of the first shell along a second side opposing the first side, the hinge allowing the two parts to selectably detach at the first side, and remain coupled at the second side.

9. The device of claim 7, the first shell comprising a latch that selectably couples the two parts together at the first side.

10. The device of claim 7, the second opening of the second shell ending in a slit at the first end.

11. A back shell wiring protector, comprising:
a hollow first shell comprising tubular shape with a first opening in a first plane disposed at a first end and a second opening disposed at a second end, the second opening comprising an annular shape disposed in a second plane that is substantially orthogonal to the first plane, wherein the first shell comprises a first lip disposed at the second opening; and
a hollow second shell comprising an annular shaped opening at a first end, and a second lip disposed at the opening of the first end, the second lip engaged with the first lip in a rotational arrangement to allow the respective first shell and second shell to operably rotate around a central axis of the second shell, wherein the second shell comprises a body shaped to operably fit a wiring connector within the body, wherein the second shell comprises a second opening at a second end sized to receive the wiring connector into the body, the second opening continuing from the second end to a wall of the second shell.

12. The back shell wiring protector of claim 11, second opening of the second shell ending in a slit at the first end.

13. The back shell wiring protector of claim 11, the first shell comprising two selectably separable walls and a hinge to hold to allow the walls to selectably open and close.

* * * * *